United States Patent

Nicolet

[15] 3,679,770
[45] July 25, 1972

[54] PROCESS FOR REMOVAL OF CATALYST COMPLEX

[72] Inventor: Charles F. Nicolet, Naperville, Ill.
[73] Assignee: Standard Oil Company, Chicago, Ill.
[22] Filed: Aug. 10, 1970
[21] Appl. No.: 62,707

[52] U.S. Cl. .................. 260/674 A, 208/13, 260/671 B, 260/671 P
[51] Int. Cl. .......................................... C07c 7/10
[58] Field of Search ............. 260/671 B, 671 P, 674 A; 208/13

[56] References Cited

UNITED STATES PATENTS 3,395,191   7/1968   Cier ................................ 260/671 P Primary Examiner—Curtis R. Davis
Attorney—Arthur G. Gilkes, William T. McClain and Thomas L. Trinley

[57] ABSTRACT

Friedel-Crafts catalyst complexes are converted into fast-settling agglomerates having easily permeable filter cakes by treatment with mixtures comprising ammonia and water.

18 Claims, No Drawings

PROCESS FOR REMOVAL OF CATALYST COMPLEX

The present invention relates to a treatment process for the removal of a metal halide-hydrocarbon catalyst complex from a Friedel-Crafts hydrocarbon-alkylation reaction mixture.

As is well known, the scope of the Friedel-Crafts reactions is very broad. For my purposes I choose to divide such catalyzed reactions into two broad categories — hydrocarbon-alkylation reactions and functional group-substitution reactions. In the hydrocarbon alkylation reactions (hereinafter referred to as alkylation reactions) both the alkylating agent and the co-reactant to be substituted are either pure hydrocarbons or else are substituted only by halide radicals. Illustrative of such hydrocarbon alkylation reactions are alkylation, dealkylation — and transalkylation — disproportionation, haloalkylation, and arylation of aromatic compounds; alkylation of aliphatic compounds; isomerization of saturated hydrocarbons; and polymerization of olefins. It is to these reactions that my process applies, and I will refer to their corresponding products as "alkylates."

Functional group substitution reactions have present — either in the substituting structure or the co-reactant to be substituted — a relatively active functional group. Such groups would include hydroxy, amido, carbonyl, cyanato, imino, isocyanato, alkoxy, or the like. Reactions characteristic of this second category are Friedel-Crafts-catalyzed acylation, aldehyde synthesis, synthesis of aryl nitriles and aldoximes, sulfonylation, sufonation, nitration, amination, and the like. The groups such reactions introduce could interfere with the operation of my neutralization process.

The Friedel-Crafts catalysts used in the foregoing reactions and to which the present invention is applicable are the metal halide-Lewis acids. Illustrative of these are aluminum chloride, aluminum bromide, beryllium chloride, cadmium chloride, zinc chloride, boron trifluoride, boron trichloride, boron tribromide, titanium tetrachloride, and the like. These catalysts, used alone, or in combination with a promoter such as a hydrogen halide, are known to interact, under the conditions of the alkylation reaction, with the hydrocarbon reactants in the alkylation mixture. Such entities that result are referred to as catalyst complexes or sludges and it is the principal object of my invention to rapidly and effectively separate them from the desired product alkylate.

The need for the present invention arises because of the difficulties which attend the existing techniques for removal of catalyst complex. While it has been customary to treat the crude alkylate with an excess of water or aqueous alkali to destroy the catalyst complex and form precipitates, it has been observed in U.S. Pat. No. 2,376,088 that such treatment is frequently accompanied by emulsification of the aqueous phase in the hydrocarbon phase. Moreover I have observed that when water alone is used the agglomerates formed tend to be gelatinous and, as will be shown, plug filtering equipment. This, of course, results in slow production rates and costly procedures due to down-time for clean-up. Anhydrous ammonia has been observed, in U.S. Pat. No. 2,368,596, to be an impractical precipitating agent for catalyst complexes because its reaction with the complex results in formation of a slow-settling precipitate which is gelatinous or "slimy" in nature. Another inadequacy of existing processes has been their inability to produce a refined reaction product having very low concentrations of chloride and carbonyl impurities. I have found unexpectedly that while the foregoing treating agents are inadequate when used alone, certain combinations of these are very effective in facilitating the separation of catalyst sludge from product alkylate.

It is therefore the object of the present invention to convert catalyst complexes to fast-settling, easily filterable agglomerates having extremely low levels of impurities.

I have now discovered that acidic metal halide-hydrocarbon catalyst complexes can be rapidly removed from crude hydrocarbon-alkylation liquors by treating them with a multicomponent treatment mixture. This treatment results in converting the complex to relatively-dense, substantially non-gelatinous agglomerates which form filter cakes that permit the passage of large quantities of filtrate before they become plugged. These agglomerates can then be removed rapidly by conventional means. Advantageously, the treatment mixture has two components — anhydrous ammonia and water. I prefer however to employ as a third component a particulate adsorbent material. It is to be understood that the terms "mixture" and "component" are convenient forms of expression and are not to be construed to imply that the components must be intermixed prior to treating the alkylate. Order of addition will be discussed more fully below.

While my process is useful for treating a wide variety of crude alkylate mixtures, it finds particular application in the Friedel-Crafts alkylation of aromatic hydrocarbons, particularly monocyclic aromatic hydrocarbons. In this type of alkylation reaction, a mono-olefinic hydrocarbon having anywhere from two to about 50 carbon atoms in the molecule is employed as the alkylating agent. Common examples of the monomers and their polymers which would be suitable as alkylating agents are ethylene, butene, butane-butylene mixtures, and propene. Such alkylation reactions are well known and in general are conducted as follows: A portion of the aromatic hydrocarbon to be substituted, for example benzene, and the Friedel-Crafts catalyst are introduced into the reaction zone; a blend of the remaining portion of the aromatic hydrocarbon and the mono-olefin alkylating agent is then slowly added while vigorously stirring the reaction mixture; the reaction is carried out in the liquid phase, at temperatures in the range of about 0° F. to about 200° F. under pressures ranging from one atmosphere up to about 500 PSI.

In these alkylation reactions the liquid phase is most conveniently provided by using, as the reaction medium itself, an excess of the hydrocarbon that is to be substituted; benzene and alkyl-substituted benzenes such as toluene, xylene, cumene and propylbenzene are common examples. Where however neither reactant is a liquid under the reaction conditions, or modification of catalyst activity is desirable, or it is necessary to adjust the viscosity of the reaction medium, an inert solvent may be employed. Illustrative of such solvents are carbondisulfide, petroleum ether, ethylene chloride, methylene chloride, carbon tetrachloride, liquid sulfur dioxide, dimethylsulfoxide, and tetramethylenesulfone.

The foregoing solvents, being inert with respect to the conversion reaction and not interacting to form complexes with the catalyst, are therefore the preferred solvents. While nitrobenzene and nitroalkanes are, in general, suitable solvents for the Friedel-Crafts hydrocarbon conversion reactions, they are known to form complexes with the acidic metal halides. Since the process of the present invention proceeds by, it is believed, chemically reacting with and neutralizing the acidic metal halide-hydrocarbon complex, any solvent which changes the nature of that complex is not preferred.

As is well known, the crude alkylate liquors contain both so-called non-settling catalyst complex sludge ("pepper" sludge) or the settling type. My process is equally applicable to remove both types. If only the "pepper" sludge is to be treated with the treatment mixture, then following the alkylation reaction the crude alkylate is allowed to remain standing for a sufficient time to settle the heavier catalyst sludge. Where the entire initial catalyst charge to the alkylation zone is to be treated, the crude alkylate containing the settling-type sludge is kept suspended in the reaction liquors by any suitable means. The effluent from the alkylation step is then subjected to my process.

One component of the treatment mixture is anhydrous ammonia. The ammonia, stored usually as a liquid under pressure, is introduced into the crude alkylation liquor at pressures and temperatures such that it volatalizes and functions within the above as a gas mixture. Advantageously, an amount of ammonia equivalent to about five to about 40 moles per mole of metal halide catalyst, present in the alkylate effluent, is employed. The preferred molar ratio range is eight to 20 moles of ammonia per mole of catalyst. The second component of the treatment mixture is water. It is used in amounts such that the molar ratio of ammonia to water preferably ranges from about 0.75:1.0 to about 5.0:1.0. Particularly preferred are ratios of about 1.0:1.0 to 2.5:1.0. Large excesses of either ammonia or water lead to undesirable systems whose performance begins to approach the undesirable single-component systems as illustrated in Table I below.

TABLE I[(1)]

Filtration Performance vs. Treatment Mixture Composition

| Mixture No. | Description[(2)] | Moles $NH_3$/ Mole $AlCl_3$ | Moles $H_2O$/ Mole $AlCl_3$ | Overall Rate[(3)]/ (Gal./ $FT^2$/Hr) | Vol. filtered before plugging/ (Gal./ $FT^2$) |
|---|---|---|---|---|---|
| 1. | $H_2O$ only | 0.0 | 6.6 | 8.9 | 1.4 |
| 2. | $NH_4OH$ only | 2.4 | 5.6 | 0.80 | 1.1 |
| 3. | $NH_3$(gas) | 4.4 | 0.0 | 0.0[(4)] | 0.0 |
| 4. | $NH_3$(g)+ $H_2O$ | 15.0 | 6.3 | 140.0 | 17.0[(5)] |
| 5. | $NH_3$(g)+$H_2O$ | 7.9 | 7.6 | 25.0 | 64.0 |

NOTES: [(1)]All filtration runs were conducted under comparable conditions. Atmospheric pressure was employed. Temperature of crude alkylate varied from about 70°F. to about 140°F., in which range viscosity is little affected.
[(2)]All mixtures included ½ to 3% by weight clay based on total crude alkylate.
[(3)]Based on total alkylate filtered until plugging occurred - i.e. - filter cake became substantially impermeable.
[(4)]The treated crude alkylate was unfilterable.
[(5)]Plugging had not yet occurred at this volume when the run was terminated since the entire amount crude alkylate sample had been filtered.

While the employment of a mixture of only anhydrous ammonia and water results in the easily handleable agglomerates of the present invention a third component, an adsorbent material, can be used and the resultant treatment mixture provides additional benefits. The adsorbent material may be any substance which is porous and hydrophilic. The most preferred bulk density of the adsorbent material will of course vary depending upon the viscosity and the density of the reaction liquors. It has, for example, been found that in removing catalyst complex from a benzene-polypropylbenzene alkylation liquor, bulk densities of the adsorbent material between 17 to about 55 pounds per cubic foot were found to be suitable. Surface area, while not being critical, affects, of course, the relative efficiency of the process. Areas may vary from 50 to 700 square meters per gram. Particle size of the adsorbent material may vary. I have successfully employed clays having substantially all particles smaller than Tyler mesh sizes of 100 and 200. The amount of adsorbent material may range from about 1 to 10 grams per gram of metal halide catalyst to be treated, preferably from about 1 to 3 grams per gram. Illustrative of the adsorbent materials which may be used in this process are natural clays of the crystalline type such as kaolin, montmorillonite, glauconite, chlorite types, vermiculite types, palygorskite types, and sepiolite, and synthetic materials such as silica-alumina compositions. Particularly preferred are the Fuller's-earth type which is a combination of montmorillonite and attapulgite, and the bentonite types.

The adsorbent material is charged to the crude alkylate as part of the treatment mixture. The adsorbent material may be either preblended with anhydrous ammonia and water or the three components may be separately but simultaneously charged to the liquor. This use of an adsorbent is in contrast to existing techniques. Heretofor adsorbent materials such as clays were used after complex sludges had settled, as in U.S. Pat. No. 2,297,292. In the present invention the adsorbent material is introduced prior to any settling and thus becomes an integral part of the agglomerate. My adsorbent material thus performs two functions not availed of in the prior art. First, it acts as a carrier for the reaction products formed when the catalyst sludge reacts with the $NH_3/H_2O$ mixture. Second, where the nature of the hydrocarbons to be converted makes the treated system sensitive to emulsification, the adsorbent material acts as an emulsification inhibitor or breaker by, it is believed, tightly adsorbing water on its external surfaces or trapping it within its internal pores.

While any of the aforementioned adsorbent materials are useful for their agglomerating effect, I have also discovered that the preferred materials, for impurities scavanging, are the Fuller's-earth type and bentonite. A particularly preferred Fuller's-earth type of clay is Florex-A-LVM-200, manufactured by the Floridin Company, whose composition is shown in Table II below.

TABLE II

| Property | Value |
|---|---|
| Free Moisture | 2% max. (by wt.) |
| Combined Moisture | 4–8% (by wt.) |
| pH | 7–9 |
| Surface Area ($m^2$/gm) | 100–130 |
| Bulk Density (lb/$ft^3$) | 36–38 |
| Composition (% by wt.) | |
| $SiO_2$ | 66.8 |
| $Al_2O_3$ | 11.8 |
| $Fe_2O_3$ | 4.1 |
| MgO | 12.0 |
| $K_2O$ | 1.1 |
| GaO | 1.6 |
| $TiO_2$ | 0.6 |

Using this clay the final product hydrocarbons from a propylene-benzene alkylation reaction were analyzed as having very small amounts of contamination; chloride content was about 1–20 ppm and carbonyls less than 0.02 percent by weight.

The foregoing components of the treatment mixture may be preblended and added to the crude alkylate as a mixture or separately added. No pre-reaction between components is needed nor has one been observed. Their form of addition — whether collective or individual — is completely optional. Where pre-blending is not employed, the order of charging the components of the mixture will depend of whether the treatment process in use is carried out in a batchwise or continuous fashion. In order to insure uniformity of the agglomerates, where continuous treatment is desired, the components of the treatment mixture must be charged to the crude conversion reaction mixture at the same time or nearly so.

In a batch system there is more flexibility in the order of addition. While the preferred and most convenient order is to charge the components of the treatment mixture simultaneously, they can be charged separately in any order.

My treatment process is generally carried out in a glass-lined reactor. The time of reaction is largely dependent upon the length of time required for the components of the treatment mixture and the crude alkylate to become well-mixed. I have conducted treatments varying in time from less than a half an hour to approximately 3 hours. The hold time has no appreciable effect on the quality of the agglomerates formed. I prefer a temperature for the treatment ranging between about 80° F. to about 150° F. The upper limit is largely determined by the boiling point of the solvent used in the alkylation reaction. Since water is a necessary component of my mixtures its loss from the system should be prevented. This can be variously accomplished by reducing the hold time and the temperature employed or alternately by returning water and water-azeo-tropes to the treatment vessel by a reflux system. Other methods within the skill of the art can undoubtedly be employed. The present process can be further illustrated by describing its use in removing catalyst complex and impurities from the alkylate resulting from the substitution of benzene with polypropylene.

9355 pounds of benzene was charged to a reactor at 80° to 95° F. 150 pounds of anhydrous aluminum chloride was then charged and the mixture stirred for 5–15 minutes. 6950 pounds of a polymeric mixture of polypropylene having an average molecular weight of about 575 was charged in equal increments every 5 minutes for a 30 minute period. The resulting reaction mixture was stirred for an additional 30 minutes for a total reaction time of 1 hour. Bulk reaction temperature was held between 130° and 150° F. The resulting crude product, containing catalyst complex, was continuously agitated so that the entire catalyst complex remained suspended in the reaction liquor. The crude alkylate was then continuously charged to a treatment vessel. Under steady state conditions 17 moles of ammonia per mole of aluminum chloride and 7.5 moles of water per mole of aluminum chloride were continuously and separately but simultaneously charged to the vessel. Three pounds of clay per pound of aluminum chloride was charged semicontinuously. Residence time in the treatment vessel was varied on different runs from one-half hour to about 3 hours. During the course of the treatment a turbine mixer was operated continuously at 120 rpm. The bulk temperature of the mixture was varied from about 88° F. to about 118° F. The treated alkylate containing agglomerates was discharged through an overflow conduit in the treatment vessel. The solid agglomerates were then separated from the alkylation product by either centrifuge or filtration.

While the invention has thus been described by specific reference to the propylene alkylation of benzene, it is to be understood that the process of this invention is equally applicable for the treatment of all Friedel-Crafts hydrocarbon alkylation liquors as hereinbefore defined. Having described my invention,

I claim:

1. A process for the removal of metal halide catalyst complexes, formed during a Friedel-Crafts hydrocarbon-alkylation reaction, from the crude liquid alkylate product which comprises treating the crude alkylate, containing substantially all the settling-type and non-settling-type catalyst complexes formed during the reaction, by adding to it a mixture comprising anhydrous ammonia and water, whereby the treatment mixture reacts with the catalyst complex and forms agglomerates; and then separating the agglomerates and the liquid alkylate.

2. The process of claim 1 wherein the anhydrous ammonia and water are added substantially simultaneously to the crude alkylate.

3. The process of claim 1 wherein the ammonia is present in amounts equal to about 5 to about 40 moles per mole of metal halide catalyst and water is present in amounts such that the molar ratio of ammonia to water ranges between about 0.75:1.0 to about 5.0:1.0.

4. The process of claim 1 wherein the range of molar ratios of anhydrous ammonia to water is about 1.0:1.0 to about 2.5:1.0.

5. The process of claim 1 wherein the treatment mixture additionally includes a porous, hydrophilic adsorbent material.

6. The process of claim 5 wherein the adsorbent material is present in amounts above about 1 gram per gram of metal halide catalyst.

7. The process of claim 5 wherein the adsorbent material is a Fuller's-earth type of clay.

8. A process for the removal of aluminum halide catalyst complexes, formed during the Friedel-Crafts alkylation of monocyclic aromatic hydrocarbons wherein the alkylating agent is a monoolefinic $C_2$ to about $C_{50}$ hydrocarbon, and wherein the aromatic hydrocarbon is a liquid and is used in excess as the sole solvent, which process comprises treating the crude alkylate, containing substantially all the settling-type and non-settling-type catalyst complexes formed during the alkylation reaction, by adding to it a mixture comprising anhydrous ammonia and water, whereby the treatment mixture reacts with the catalyst complex and forms agglomerates; and then separating the agglomerates and the liquid alkylate.

9. The process of claim 8 wherein the anhydrous ammonia and water are added substantially simultaneously to the crude alkylate.

10. The process of claim 8 wherein the ammonia is present in amounts equal to about 5 to about 40 moles per mole of metal halide catalyst and water is present in amounts such that the molar ratio of ammonia to water ranges between about 0.75:1.0 to about 5.0:1.0.

11. The process of claim 8 wherein the range of molar ratios of anhydrous ammonia to water is about 1.0:1.0 to about 2.5:1.0.

12. The process of claim 8 wherein the treatment mixture additionally includes a porous, hydrophilic adsorbent material.

13. The process of claim 12 wherein the adsorbent material is present in amounts above about 1 gram per gram of metal halide catalyst.

14. The process of claim 12 wherein the adsorbent material is a Fuller's-earth type of clay.

15. A process for the removal of either settling-type or non-settling-type metal halide catalyst complexes, formed during the Friedel-Crafts hydrocarbon-alkylation reaction, from the crude liquid alkylate product which comprises treating the crude alkylate by adding to it a mixture comprising anhydrous ammonia and water, the anhydrous ammonia and water being added substantially simultaneously, the ammonia being present in amounts equal to about 5 to about 40 moles per mole of metal halide catalyst with the range of molar ratios of anhydrous ammonia to water being about 1.0:1.0 to about 2.5:1.0, whereby the treatment mixture reacts with the catalyst complex and forms agglomerates; and then separating the agglomerates and the liquid alkylate.

16. A process for the removal of either settling-type or non-settling-type aluminum halide catalyst complexes, formed during the Friedel-Crafts alkylation of monocyclic aromatic hydrocarbons wherein the alkylating agent is a monoolefinic $C_2$ to about $C_{50}$ hydrocarbon, and wherein the aromatic hydrocarbon is a liquid and is used in excess as the sole solvent, which process comprises treating the crude alkylate by adding to it a mixture comprising anhydrous ammonia and water, the anhydrous ammonia and water being added substantially simultaneously to the crude alkylate, the ammonia being present in amounts equal to about 5 to about 40 moles per mole of metal halide catalyst with the range of molar ratios of anhydrous ammonia to water being about 1.0:1.0 to about 2.5:1.0, whereby the treatment mixture reacts with the catalyst complex and forms agglomerates; and then separating the agglomerates and the liquid alkylate.

17. The process of claim 7 wherein the clay is Florex-A-LVM-200.

18. The process of claim 14 wherein the clay is Florex-A-LVM-200.

* * * * *